June 7, 1932.   C. S. BRAGG ET AL   1,862,294
BRAKE MECHANISM FOR AUTOMOTIVE VEHICLES
Original Filed July 29, 1926   3 Sheets-Sheet 1
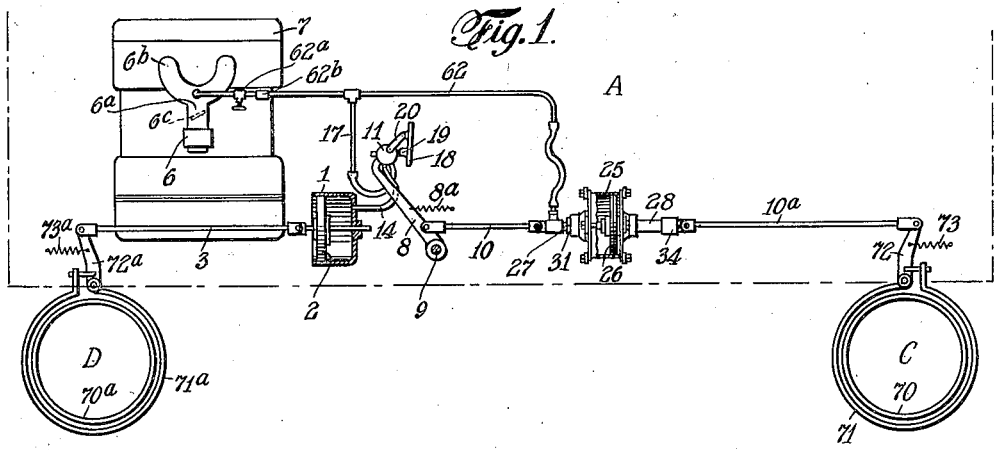
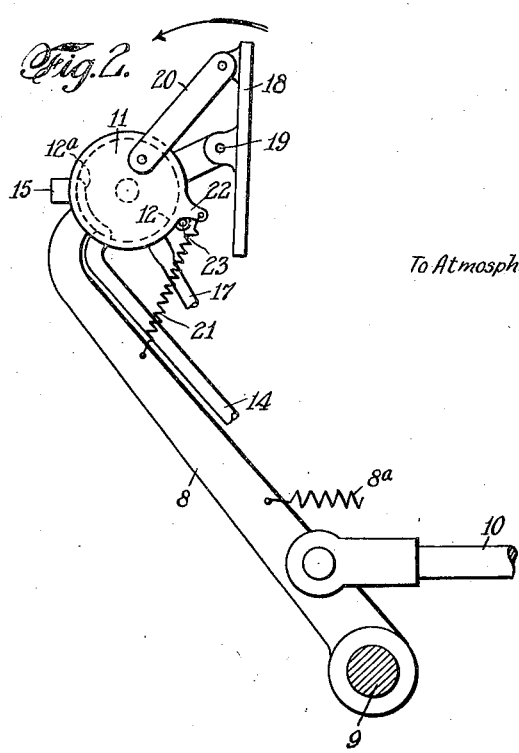
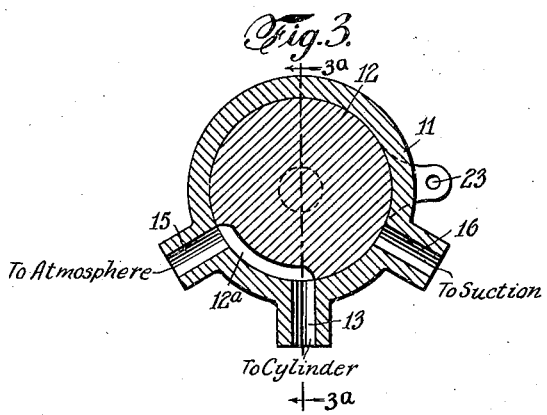
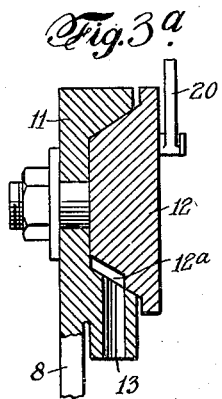

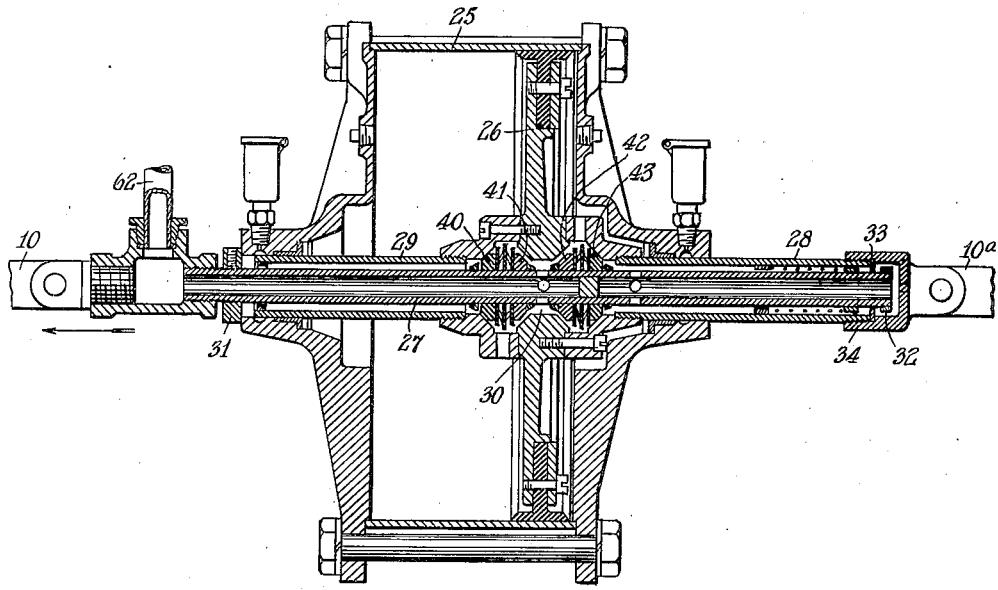
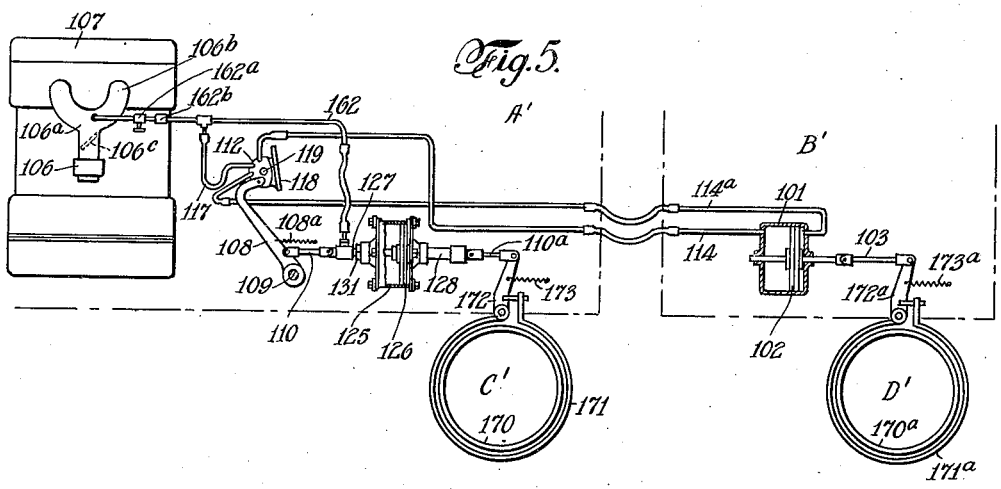

June 7, 1932.  C. S. BRAGG ET AL  1,862,294
BRAKE MECHANISM FOR AUTOMOTIVE VEHICLES
Original Filed July 29, 1926  3 Sheets-Sheet 3
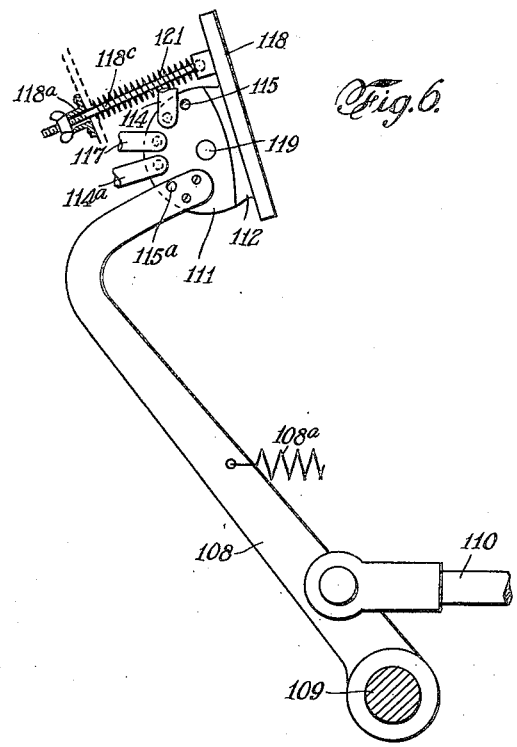
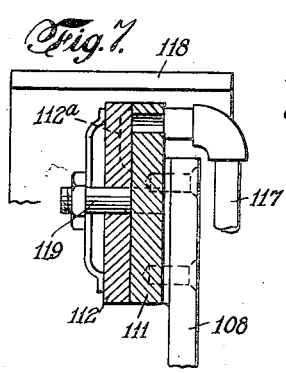
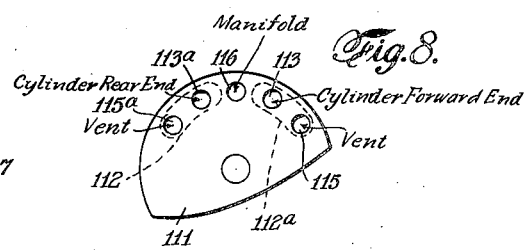

Patented June 7, 1932

1,862,294

UNITED STATES PATENT OFFICE

CALEB S. BRAGG, OF PALM BEACH, FLORIDA, AND VICTOR W. KLIESRATH, OF SOUTH BEND, INDIANA, ASSIGNORS TO BRAGG-KLIESRATH CORPORATION, OF LONG ISLAND CITY, NEW YORK, A CORPORATION OF NEW YORK

BRAKE MECHANISM FOR AUTOMOTIVE VEHICLES

Original application filed July 29, 1926, Serial No. 125,615. Divided and this application filed August 3, 1929. Serial No. 383,220. Renewed November 9, 1931.

Our invention consists in the novel features hereinafter described, reference being had to the accompanying drawings which illustrate several embodiments of the same selected by us for purposes of illustration, and the said invention is fully disclosed in the following description and claims.

Our present invention is a division of our former application for Letters Patent of the United States filed July 29, 1926, and given Serial No. 125,615. Our present invention is an improvement in vacuum brake systems for automotive vehicles in which the throttle controlled suction passage of the internal combustion engine, which propels the vehicle, is relied upon to produce the vacuum or lower fluid pressure, and it consists in a plurality of power actuators, each comprising a cylinder and piston, for operating brake mechanism and controlling valve mechanism, certain of said actuators having the piston thereof submerged in vacuum, and certain of said actuators having the piston thereof submerged in the higher pressure fluid, (normally atmosphere) when in the released position, in combination with operator operated means for effecting independent power strokes of said actuators or simultaneous power strokes thereof, preferably under the control of a single physically operable part to the end that air is not withdrawn at the same time from the actuators of both the types mentioned in effecting a power stroke to apply the brakes, and in the preferred form of our invention is never withdrawn from the actuators of both types at the same time, either during the power stroke or the return stroke of the actuators. Our invention thus enables us to employ a plurality of actuators without increasing the amount of air which is discharged at any one time into the suction passage of the engine, thus greatly reducing the liability of stalling the engine by connecting a plurality of actuators thereto, and without interfering with the rapidity of operation of the actuators.

Our invention also comprises the novel features of construction and combination of parts hereinafter described and particularly pointed out in the claims.

In the drawings which illustrate several embodiments of our present invention selected by us for purposes of illustrating the same, Fig. 1 is a diagrammatic view illustrating an installation embodying our invention in connection with brake mechanism of an automotive vehicle.

Fig. 2 is an enlarged detail view of one form of pedal lever, pedal, and pedal operated valve mechanism, which may be employed in carrying our invention into effect.

Fig. 3 is a detail sectional view of the pedal operated valve mechanism shown in Fig. 2 and further enlarged.

Fig. 3a is a vertical sectional view on the line 3a, 3a, of Fig. 3.

Fig. 4 represents an enlarged sectional view of one of the power actuators shown in Fig. 1, the valve mechanism of which is operatively connected with the pedal lever.

Fig. 5 is a diagrammatic view similar to Fig. 1, in which the pedal lever is connected with the valve mechanism of a single acting actuator, and the relatively movable pedal is connected with valve mechanism for controlling a double acting actuator, in this instance located on a trailing vehicle.

Fig. 6 is an enlarged detail view of the movable pedal and valve mechanism illustrated in Fig. 5, in side elevation.

Fig. 7 is a rear view of the same partly in section.

Fig. 8 is a diagrammatic view illustrating the registering ports of the valve mechanism shown in Figs. 5, 6 and 7.

Referring to the form of our invention shown in Figs. 1 to 4 inclusive, our invention is illustrated embodied in the brake system for an automotive vehicle, indicated in dotted lines at A. 7 represents an internal combustion engine provided with the usual carburetor, 6, suction passage, 6ª, intake manifold, 6ᵇ, and throttle valve, 6ᶜ. The brake mechanism of the vehicle in this instance comprises rear wheel brake mechanisms, C, and front wheel brake mechanisms, D, one of each of which is shown diagrammatically in Fig. 1. The brake mechanisms, C, are shown as comprising a friction drum, 70, friction band, 71, brake applying lever, 72, and retracting spring, 73, the brake mechanisms, D, are shown as of similar construction, the parts being given the same reference numerals with the addition of a. It is to be understood, however, that the brake mechanisms may be of any preferred type and may be applied to suitable connections to as many wheels of the vehicle as desired, in any well known or usual manner.

1 represents the cylinder of a power actuator of the type in which the piston is submerged in the higher fluid pressure, (atmosphere) when in the released position, the cylinder being in this instance closed at one end and open at the other. The cylinder is mounted on the chassis of the vehicle and provided with a piston, 2, which in this instance is connected by a link, 3, with the brake mechanisms, D, of the vehicle. In Fig. 1 a second power actuator is mounted on the chassis of the vehicle and operatively connected with the rear wheel brake mechanisms, C. This power actuator is of the type in which the piston is maintained submerged in the lower fluid pressure or vacuum, when in the released position, and is illustrated in section in Fig. 4. Briefly stated, the actuator comprises a cylinder, 25, provided in this instance with a double acting piston, 26, the hub of which contains the reversing valve mechanism, the valves of which are indicated at 40, 41, 42 and 43, and are operatively controlled by a longitudinally movable valve actuating sleeve, 27, extending through the hub of the piston and through the oppositely disposed piston rods, 28 and 29, through which atmospheric air is admitted to the cylinder under the control of the valve mechanism, the valve mechanism being connected with the intake manifold, $6^b$, of the internal combustion engine, 7, between the throttle valve, $6c$, and the engine cylinder, by a pipe, 62, having a flexible portion connected with the valve actuating sleeve and communicating with a suction chamber, 30, in the interior of the piston hub. The suction pipe is shown provided with an adjustable restricting or regulating valve, $62^a$, and a check valve, $62^b$. The suction valves, 41 and 42, are normally held in open position when the piston is retracted, as shown in Fig. 4, by means of an adjustable collar, 31, on the valve sleeve, 27, which engages the adjacent end of the cylinder, so that the piston is maintained submerged in vacuum when the engine is running, and the throttle closed or partly closed, but the particular construction of the actuator and its valve mechanism form no part of our present invention. The piston rod, 28, is in this instance connected by a link rod, $10^a$, with the brake operating lever, 72, of the brake mechanisms, C. In this instance the valve sleeve, 27, is also connected with the piston, 26, of the actuator, 25, by means permitting lost motion, sufficient to insure the operation of the valve mechanism, and in Fig. 4, for example, we have shown the valve actuating sleeve provided with a collar, 32, adapted to engage a collar, 33, on the piston rod, 28, and to engage the inner end of a cap, 34, secured thereto, to provide the lost motion necessary and at the same time to permit the valve actuating sleeve to directly operate the piston and the brake mechanism connected therewith in either direction in case of failure of power.

In this instance we have shown the vehicle provided with a brake pedal lever, 8, connected pivotally at 9, to the chassis and connected by a link, 10, with the valve actuating sleeve, 27, of the power actuator just described, and connected through the lost motion connection with the brake mechanisms operated by the actuator. The actuator for operating the front wheel brake mechanisms, D, is controlled by means of a pedal, 18, carried by the pedal lever, 8, and movably supported thereon and connected with separate controlling valve mechanism for operating said power actuator. As indicated in Figs. 1, 2, 3 and $3^a$, this controlling valve mechanism comprises a housing, 11, rigidly secured to the pedal lever adjacent to its upper end and provided with a rotary valve, indicated at 12, mounted in the housing and provided with a recess, $12^a$. The housing is provided with a port, indicated at 13, connected by a pipe, 14, with the cylinder, 1, of the actuator. The portion of the pipe, 14, adjacent to the pedal is made flexible to permit of the movement of the pedal lever. The valve casing or housing, 11, is also provided with a port, 16, which is connected by a pipe, indicated at 17, a portion of which is flexible with the intake manifold, $6^b$, it being shown in this instance connected with the suction pipe, 62. As shown, the suction pipe, 62, is connected to the suction passage of the engine between the throttle valve and the engine cylinders. The housing, 11, is also provided with a port, 15, communicating with the atmosphere or other source of higher fluid pressure.

The pedal lever, 8, is shown provided with the usual retracting spring, $8^a$, connected with the chassis, and the pedal, 18, is operatively connected with the valve, 12, in this instance by a link, 20, the valve and pedal being also provided preferably with yielding means for holding them in the off position, and in this instance we have shown a spring, 21, connected with an arm, 22, secured to the valve, and adapted to engage a stop, 23, secured to the housing for holding the valve in normal or off position, at which time the recess, $12^a$, of the valve places the cylinder port, 13, in communication with the higher pressure or atmospheric port, 15.

By means of this construction, if the operator places his foot on the pedal, 18, and depresses the pedal lever, 8, without rocking the pedal, the valve sleeve, 27, will be moved in the direction of the arrow in Fig. 4, so as to shift the reversing valve mechanism and admit atmospheric air in rear of the piston, 26, while maintaining the forward end of the cylinder in communication with the suction pipe, 62, without admitting any appreciable quantity of air to the suction passage of the engine from the actuator cylinder, as the cylinder, 25, forward of the piston was previously exhausted. If the operator on the contrary merely rocks the pedal, 18, in a forward direction, indicated by the arrow in Fig. 2, the actuator for the front wheel brakes will be operated by exhausting the air forward of the piston to apply the front wheel brake mechanisms, D. By both rocking the pedal, 18, and depressing the pedal lever, 8, both sets of brakes may be simultaneously applied to the degree desired by and under the perfect and independent control of the foot of the operator.

As one of the independently operable valve mechanisms controls an actuator in which the piston is submerged in vacuum as indicated at 25, and the other valve mechanism controls an actuator as 1, in which the piston is normally submerged in atmosphere, it follows that even when both actuators are simultaneously operated, by the simultaneous actuation of both valve mechanisms, air can only be withdrawn from one of them at a time and delivered to the intake manifold. Thus in the construction shown in Fig. 1, the operation of both valve mechanisms, by rocking the pedal, 18, and simultaneously depressing the lever, 8, will withdraw air from cylinder, 1, but no air will be withdrawn from cylinder, 25, for the reason previously stated. If both actuators are now simultaneously released, the piston, 2, will be returned to normal position by admitting air to the cylinder, 1, and the piston, 26, will be returned to its normal position by differential pressures set up in the actuator, 25, during the return stroke, this by virtue of the double acting valve structure. The advantage of this arrangement is that as air is never withdrawn at the same time from both actuators into the suction passage, the liability of stalling the engine by the connection to the suction passage of two actuators is greatly reduced, if not entirely eliminated, without interfering with the rapidity of operation of the actuators. If, for example, two actuators having their piston submerged in atmosphere were employed, the air would have to be exhausted from both actuator cylinders simultaneously during the power stroke to apply the brakes, at which time the throttle valve, 6°, would ordinarily be in a closed or partly closed position, and the quantity of explosive mixture passing through the suction passage would be substantially at minimum. Under such conditions the discharge of so large a quantity of air into the suction passage would probably stall the engine, and if the regulating valve, 62ª, were closed sufficiently to prevent this, the operation of applying the brakes would be materially slowed down and retarded. On the other hand, if two cylinders in which the pistons are submerged in vacuum were employed, while there would not be a simultaneous withdrawal of air from both cylinders during the power stroke of the piston, there would be such a simultaneous withdrawal of air from both cylinders when the brakes were released, and this might easily take place before the throttle valve could be opened to accelerate the engine, thus stalling the engine. The construction illustrated in Fig. 1 obviates this difficulty entirely and permits the use of actuators of adequate size in vehicles having a comparatively small engine, and permits the use of actuators of approximately twice the size that could otherwise be used on vehicles having a comparatively small engine. It will be understood that the size of the cylinder of a pressure balanced actuator which can ordinarily be used is limited by the amount of air which can be withdrawn sufficiently rapidly for a satisfactory operation of the brakes, into the suction passage without stalling the engine, and the size of the cylinder of a vacuum balanced actuator is similarly limited by the amount of air that can be withdrawn into the suction passage to give a satisfactory release of the brakes without stalling the engine. Our present invention permits the approximate doubling of the capacity of the cylinders by combining the two types of actuator. As shown in the drawings the valve mechanism for the vacuum balanced actuator secures an equalization of pressures between the portions of the cylinder on opposite faces of the piston, but this is not essential to our present invention, and it will operate successfully where the air is directly withdrawn from the cylinder in rear of the piston to release the brakes.

In the construction illustrated in Fig. 1, it will also be understood that when the brake mechanism for the rear wheels has been fully applied by the actuator, the operator, by further depressing the pedal, 8, and taking up the lost motion between the valve actuating sleeve, 27, and the piston, 26, may add his force to that of the actuator, and it will also be understood that in case of failure of power, the operator may, by depressing the pedal lever, 8, take up this lost motion and positively move the piston, 26, and operate the brake mechanism connected therewith by his physical force alone when necessary or desired.

It is to be understood that the pedal, 18, is so connected with the pedal lever, 8, that in any position to which the pedal may be rocked with respect to the lever, the operator can nevertheless exert his physical force also to depress the lever with respect to its pivotal connection, and we prefer to so construct the pedal and its connection with the valve mechanism which it controls, that the placing of the operator's foot on the pedal in the normal position of his foot will tilt the pedal forward in the direction of the arrow in Fig. 2. The pedal lever is so pivoted that its operative movement is forward and downward, so that if the operator does not change the position of his foot from the natural position thereof, the depression of the pedal lever will effect the rocking of the pedal rearwardly in a direction to disconnect the suction port, 16, from the cylinder port. It follows, therefore, that in order to operate the pedal lever, 8, and the brake mechanism controlled thereby, independently of the brake mechanism controlled by the pedal, the operator must consciously rock the toe of his foot a little back of the normal position, when he applies it to the pedal. If he desires to continuously operate the brake mechanism controlled by the pedal, he must continue to depress his toe beyond the natural position, if the lever, 8, is also depressed. This arrangement permits him to have a complete and independent control of both lever and pedal, and the separate brake mechanisms operated thereby at all times. The particular details of the movably mounted pedal and the valve mechanism connected therewith are not claimed herein, as they form the subject matter of our former application for Letters Patent of the United States, filed April 3, 1925, and given Serial No. 20,333.

In Fig. 5 we have shown, diagrammatically, an installation including a main vehicle and trailer, in which separate brake mechanisms, in this instance brake mechanisms of the main vehicle and trailer, are independently or simultaneously controlled by the pedal lever, and the pedal movable with respect thereto, through separate power actuators, and in this instance we have shown the actuator controlled by the pedal as being double acting instead of single acting. In this figure A' represents the main vehicle, indicated diagrammatically by dotted lines, and B' in a similar manner indicates diagrammatically the trailing vehicle. The main vehicle is shown provided with an internal combustion engine, 107, having a carburetor, 106, connected by suction passage, 106a, with the intake manifold, 106b, the suction passage being provided with a throttle valve, 106c. The brake mechanism of the main vehicle is indicated at C', and may be of any desired type, and may affect as many wheels of the vehicle as preferred. As represented diagrammatically, it includes the brake drum, 170, the brake band, 171, brake lever, 172, and retracting spring, 173, the brake lever being connected by link rod, 110a, with the piston rod, 128, of a power actuator, the cylinder of which is indicated at 125, and which may be of the kind illustrated in Fig. 4, having its piston normally submerged in vacuum, for example, and previously described, or it may be of any other desired type. As shown, the valve actuating sleeve, 127, is connected by suction pipe, 162, with the intake manifold of the engine, a portion of the pipe being flexible. The valve actuating sleeve, 127, is connected by link, 110, with the brake pedal lever, 108, pivoted at 109, so that the forward movement of the lever effects the operation of the valve mechanism of the actuator and applies the brake mechanism, C', of the main vehicle, in the manner described with reference to Fig. 1, and is also capable of applying the physical force of the operator directly to the brake mechanism, as previously described, when necessary or desirable.

The brake mechanism for the trailer, B', indicated diagrammatically at D', and shown diagrammatically as the brake drum, 170a, the brake band, 171a, brake lever, 172a, and retracting spring, 173a, is operated in this instance by a double acting actuator, the cylinder of which is indicated at 101, under the control of valve mechanism carried by the pedal lever and operated by the movable pedal, 118. In this instance the actuator cylinder, 101, is provided with a double acting piston, 102, the piston rod of which is connected by link, 103, with the brake lever, 172a, of the trailer brake mechanism. The pedal lever, 118, is pivoted at 119, to the upper end of the brake lever, 108, and operatively connected with the controlling valve mechanism for the actuator, 101, which we term for convenience of reference, the auxiliary actuator. Any desired form of valve mechanism may be employed, but we have shown in this instance a valve mechanism carried by the pedal lever and comprising a stationary plate, 111, rigidly connected to the lever, 108, and provided with a port, 113, connected by pipe, 114, with the cylinder, 101, forward of the piston a port, 113a, connected by pipe, 114a, with the cylinder in rear of the piston, said plate being provided with vent apertures, 115 and 115a, communicating with the atmosphere and with a port, 116, connected with the manifold by a flexible pipe, 117, in this instance connected with the main suction pipe, 162. 112 represents a valve member pivotally connected to the plate, 111, and provided with recesses, 112a, indicated in dotted lines in Fig. 8, so located as to connect each of the ports, 113 and 113a, with the vent apertures, 115 or 115a, when the valve is in neutral position, in which it is held by a spring, 121 surrounding guide rod 118c the compression of the spring being determined by wing nut 118A. The piston, 102 is thus maintained submerged in atmosphere. By rocking the pedal in the forward direction against this spring, the suction port, 116, will be placed in connection with the port, 113, leading to the front end of the cylinder of the actuator. The vent aperture, 215, for this portion of the cylinder will be closed and the port, 113a, communicating with the rear portion of the cylinder will remain in communication with the vent aperture, 115a. The air forward of the piston, 102, will therefore be withdrawn through the suction passage, while atmospheric air will be admitted in rear of the piston through the vent aperture, 115, so that the piston will move forward in a direction to apply the brakes and can be arrested at any moment by rocking the pedal back to normal position. By rocking the pedal backward of its normal position, the suction port, 116, can be placed in communication with the port, 113a, leading to the cylinder in rear of the piston to withdraw the air previously admitted, while the vent, 115, will be in communication with the port, 113, and will admit air to the cylinder, 201, forward of the piston, thus positively moving the piston rearwardly to release the brake mechanism and restore it and the piston, 102, to normal position. When the foot is removed from the pedal, the spring, 121, will restore it to normal or off position.

In the arrangement illustrated in Fig. 5, therefore, it will be seen that if both valve mechanisms are simultaneously actuated to effect a power stroke of each, air will be withdrawn only from the cylinder, 101, forward of the piston thereof, as in the construction shown in Fig. 4, the air having been previously exhausted from cylinder, 125, forward of its piston when both valve mechanisms are simultaneously released. However, air will be withdrawn from both actuator cylinders in rear of the pistons therein to permit the release of the brake mechanisms, C', and effect the release of the brake mechanisms, D'. As this increased amount of air, however, is withdrawn during the release and return of the brakes, stalling of the engine can be prevented by properly adjusting the restricting valve, 162a, as it is not so important that the brakes should be swiftly returned to released position as it is that they should be quickly applied, especially in view of the fact that a very slight relaxation of pressure is sufficient to relieve the braking action.

What we claim and desire to secure by Letters Patent is:—

1. In a brake system for automotive vehicles provided with an internal combustion engine having a throttle controlled suction passage, the combination with a plurality of power actuators, each provided with a cylinder, a piston therein, provided with means for connecting it with brake mechanisms, certain of said actuators having the piston thereof submerged in vacuum, and certain of said actuators having the piston thereof submerged in higher pressure fluid when in the released position, means including valve mechanisms for connecting said actuator cylinders with said suction passage and with a source of higher fluid pressure, and operator operated means connected with said valve mechanisms for effecting the simultaneous operation of said actuators to produce power strokes thereof.

2. In a brake system for automotive vehicles provided with an internal combustion engine having a throttle controlled suction passage, the combination with a plurality of power actuators, each provided with a cylinder, a piston therein, provided with means for connecting it with brake mechanisms, certain of said actuators having the piston thereof submerged in vacuum, and certain of said actuators having the piston thereof submerged in higher pressure fluid when in the released position, means including valve mechanism for connecting said actuator cylinders with said suction passage and with a source of higher fluid pressure, a single operator operated part and connections therefrom to each of said valve mechanisms for effecting the simultaneous and independent operation and control of said actuators and the brake mechanisms operated thereby.

3. In a brake system for automotive vehicles provided with an internal combustion engine having a throttle controlled suction passage, the combination with two independently operable power actuators, each provided with a cylinder and a piston therein having means for connecting the latter with brake mechanisms, and means including controlling valve mechanisms for connecting the actuator cylinders with said suction passage and with a higher fluid pressure source, the pistons of said actuators being respectively maintained submerged in vacuum and submerged in higher fluid pressure when the brake mechanisms are in released position, and operator operated means having relatively movable parts each connected to one of said valve mechanisms, for operating them separately or simultaneously.

4. In a brake system for automotive vehicles provided with an internal combustion engine having a throttle controlled suction passage, the combination with two independently operable power actuators, each provided with a cylinder, a piston therein, having means for connecting it with brake mechanisms, and means including controlling valve mechanisms for connecting the actuator cylinders with said suction passage and with a higher fluid pressure source, the pistons of said actuators being respectively maintained submerged in vacuum and submerged in higher fluid pressure when the brake mechanisms are in released position, a pedal lever, connections between the pedal lever and the valve mechanism for one of said actuators, a rocking pedal pivotally connected with the pedal lever, and operative connections between said pedal and the other of said valve mechanisms.

5. In a brake system for automotive vehicles provided with an internal combustion engine having a throttle controlled suction passage, the combination with a power actuator comprising a cylinder closed at both ends, a piston therein, and means including controlling valve mechanism for connecting said cylinder with said suction passage and with a source of higher fluid pressure, and normally maintaining the cylinder on both sides of the piston in communication with the suction passage when the parts are in released position, a second power actuator comprising a cylinder, a piston therein, and means including controlling valve mechanism for connecting said cylinder forward of the piston with said suction passage and with a source of higher fluid pressure, said cylinder in rear of the piston being connected at all times with the source of higher pressure, and operator operated means connected with both of said valve mechanisms and capable of operating the same simultaneously to effect the simultaneous application or release of the brake mechanisms connected with said actuators without at any time discharging material quantities of air from more than one of said actuators into the suction passage.

6. In brake system for automotive vehicles provided with an internal combustion engine having a throttle controlled suction passage, the combination with a power actuator comprising a cylinder closed at both ends, a piston therein, and means including controlling valve mechanism for connecting said cylinder with said suction passage and with a source of higher fluid pressure, and normally maintaining the cylinder on both sides of the piston in communication with the suction passage when the parts are in released position, a second power actuator comprising a cylinder, a piston therein, and means including controlling valve mechanism for connecting said last mentioned cylinder forward of the piston with said suction passage and with a source of higher fluid pressure, said last mentioned cylinder in rear of the piston being connected at all times with the source of higher pressure, and operator operated means having relatively movable parts each connected to one of said valve mechanisms for operating them separately or simultaneously.

7. In a brake system for automotive vehicles provided with an internal combustion engine having a throttle controlled suction passage, the combination with a power actuator comprising a cylinder closed at both ends, a piston therein, and means including controlling valve mechanism for connecting said cylinder with said suction passage and with a source of higher fluid pressure, and normally maintaining the cylinder on both sides of the piston in communication with the suction passage when the parts are in released position, a second power actuator comprising a cylinder, a piston therein, and means including controlling valve mechanism for connecting said last mentioned cylinder forward of the piston with said suction passage and with a source of higher fluid pressure, said last mentioned cylinder in rear of the piston being connected at all times with the source of higher pressure, a pedal lever connected with one of said valve mechanisms, and a rocking pedal pivotally connected with said lever and operatively connected with the other valve mechanism.

8. In a brake system for automotive vehicles provided with an internal combustion engine having a throttle controlled suction passage, a vacuum balanced power actuator, and a pressure balanced power actuator, said actuators having their pistons connected with brake mechanisms, means including valve mechanisms for connecting said actuators with said suction passage and with a source of higher fluid pressure, and operator operated means connected with said valve mechanisms for simultaneously operating said actuators, whereby when the engine is running the brake mechanisms connected with said actuators are applied by withdrawing air from one actuator on one side of its piston and admitting air to the other actuator on the other side of its piston, and air from only one actuator is discharged into the suction passage.

9. In a brake system for automotive vehicles provided with an internal combustion engine having a throttle controlled suction passage, a vacuum-balanced power actuator and a pressure-balanced power actuator, said actuators having their pistons connected with brake mechanisms, means including valve mechanism for connecting the pressure-balanced actuator forward of its piston and the vacuum-balanced actuator in rear of its piston with said suction passage and with a source of higher fluid pressure said means at all times connecting the vacuum-balanced actuator forward of its piston with said suction passage, and operator operated means connected with said valve mechanism for simultaneously operating said actuators, whereby when the engine is running the brake mechanisms connected with said actuators are applied and released by withdrawing air from one actuator on one side of its piston and admitting air to the other actuator on the other side of its piston, and air from only one actuator is discharged into the suction passage during the application and the release of the brake mechanisms.

In testimony whereof, we affix our signatures.

CALEB S. BRAGG.
VICTOR W. KLIESRATH.